GILBERT & GAY.
Vulcanizing Apparatus.
No. 5,196. 
2 Sheets—Sheet 1.
Patented July 17, 1847.
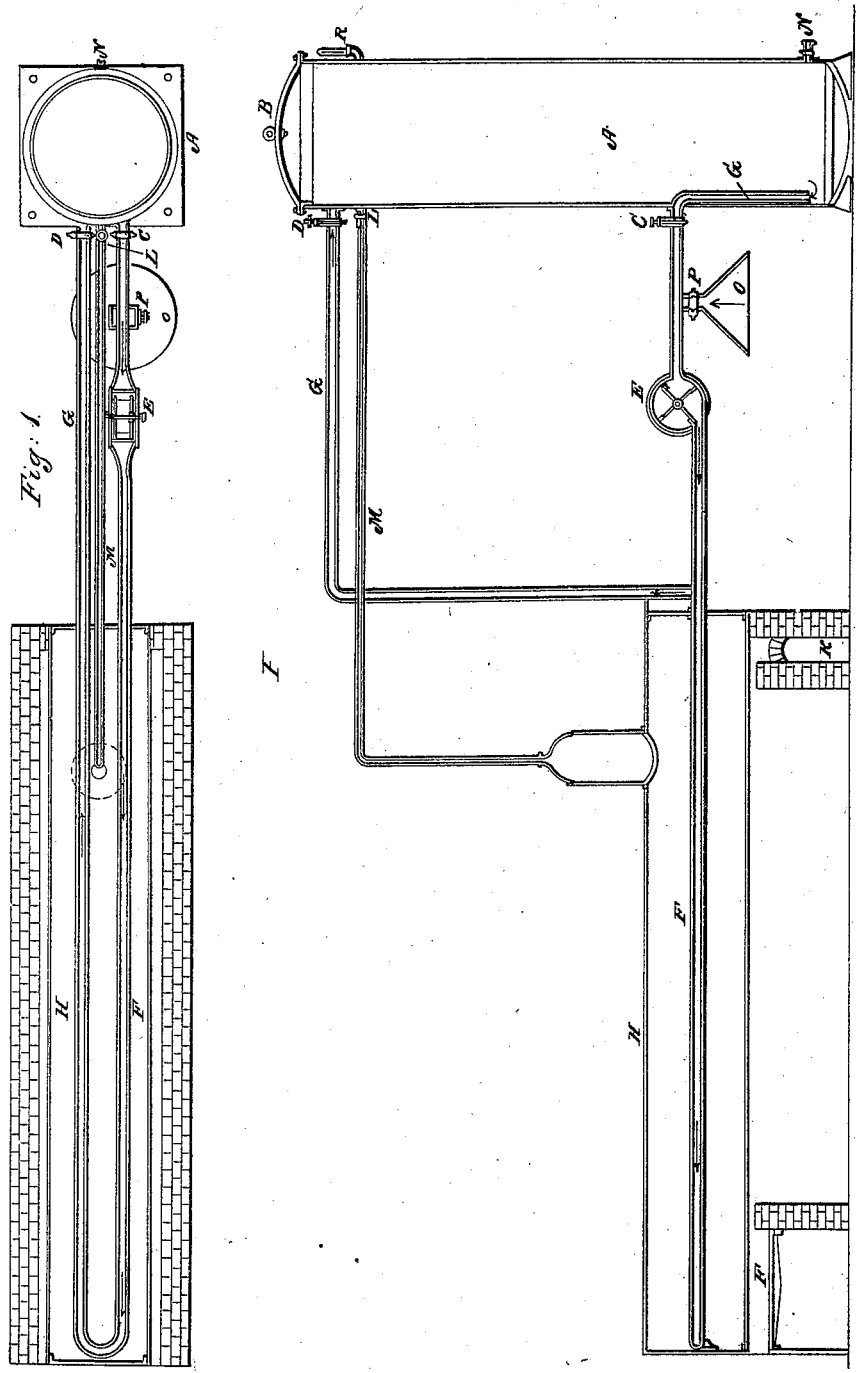

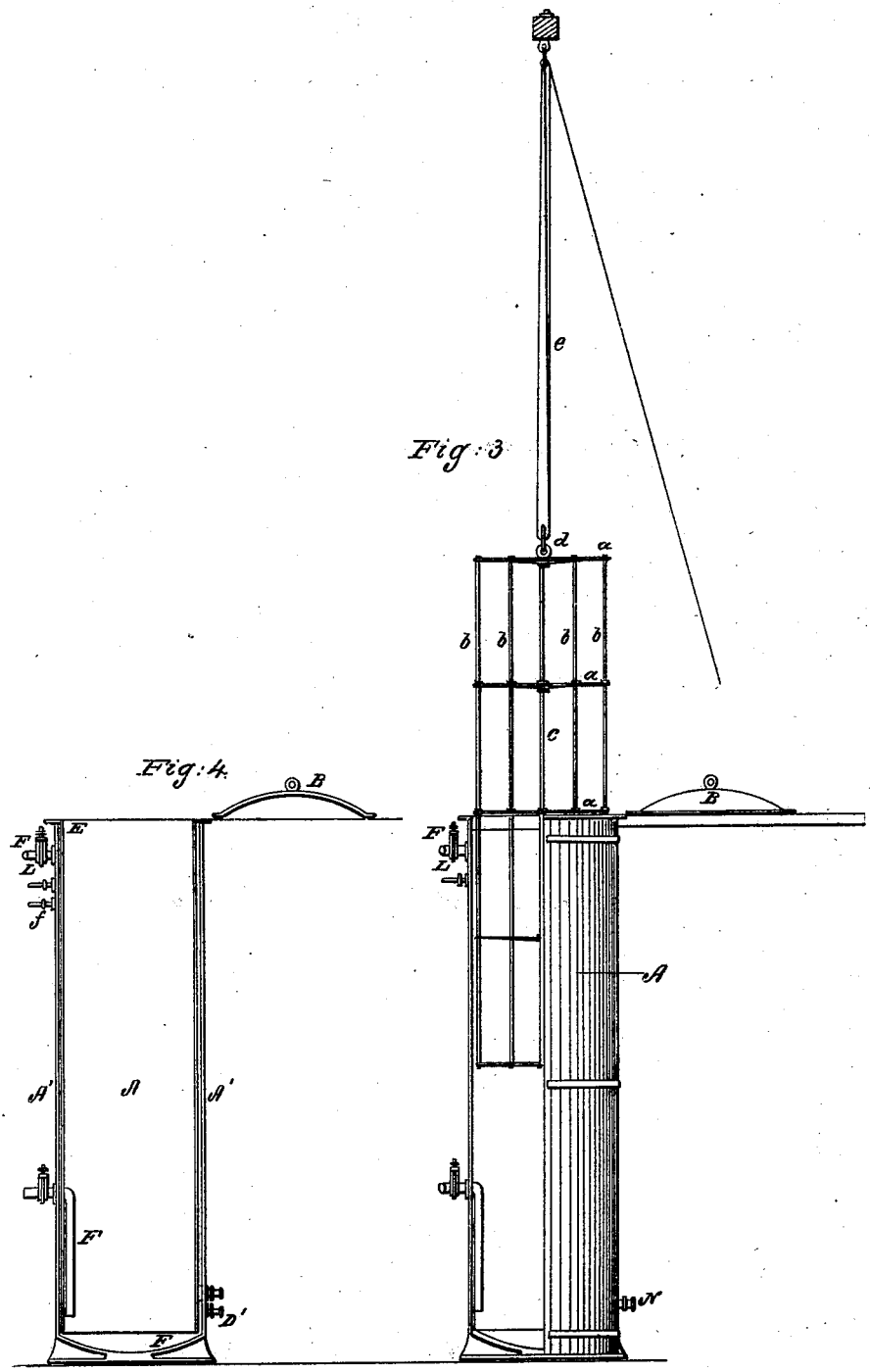

UNITED STATES PATENT OFFICE.

CHAS. J. GILBERT AND GAMALIEL GAY, OF NEW YORK, N. Y.

INDIA-RUBBER FABRIC.

Specification of Letters Patent No. 5,196, dated July 17, 1847.

*To all whom it may concern:*

Be it known that we, CHARLES J. GILBERT and GAMALIEL GAY, of the city, county, and State of New York, have invented new and useful Improvements in the Process for the Treatment of Raw India-Rubber or Caoutchouc and the Manufactures Thereof and in the Apparatus Therefor, and that the following is a full, clear, and exact description of the principle or character which distinguishes them from all other things before known and of the manner of making, constructing, and using the same, reference being had to the accompanying drawings, making part of this specification, in which—

Figure 1 is a plan of the apparatus; Fig. 2, a vertical section thereof; Fig. 3, an elevation of a modification of the apparatus; and Fig. 4, a vertical section thereof.

The same letters indicate like parts in all the figures.

The first part of our invention relates to the curing or seasoning of raw india rubber or caoutchouc, that is, to the extracting therefrom the sap, which has heretofore been done by exposure to the atmosphere, requiring much time; and this part of our invention consists in subjecting the raw india rubber or caoutchouc of commerce to the action of dry heat and steam of 200 degrees of Fahrenheit's scale (more or less), until the foreign matter called "sap" is thoroughly extracted therefrom.

The second part of our invention relates to the method of heating, curing, or drying india rubber fabrics, and consists in subjecting the fabrics when finished, but in that condition when the surface is soft and tacky, to the combined action of heat and steam.

The third part of our invention relates to the application of sulfur to the india rubber in the process of curing, which has heretofore been done by applying the sulfur in a pulverized state or the flowers of sulfur to the surface of the india rubber, or incorporating it therewith before submitting it to the curing process; and our invention in this part of the process consists in subjecting india rubber or the fabrics thereof to the fumes of sulfur, or to sulfurous acid gas, either before or when exposed to the heat in the curing process, whether this (the curing process) be effected by heated air, by steam, or by both.

The fourth part of our invention relates to the method of removing from the surface of india rubber fabrics the peculiar clammy feeling which it possesses after the process of heating, curing, or drying, and which has heretofore been effected by exposure to the sun, and technically termed "sunning"; and this part of our invention consists in exposing the surface of such fabrics to a rapid current of air which in a short space of time removes entirely that peculiar clammy feeling so well known to those acquainted with this branch of manufactures, and which has not heretofore been effected by any other process than exposure to the sun. And, the fifth part of our invention relates to the apparatus for the application of the various parts of our processes, and consists in placing the cylinder, which receives the india rubber fabrics to be cured in a vertical position that the fabrics may hang loosely from a series of hoops which are slipped in from the top, instead of placing them on a car that runs on rails in a horizontal cylinder; also, in heating the cylinder and the fabrics within it to above the boiling point and keeping it so heated to prevent the condensation of the steam on the fabrics when introduced to act thereon in the process of curing; in combining with the vessel that receives the fabrics a tube provided with a blower for the purpose of carrying a rapid current of air through the vessel—the tube for this purpose being made to connect with both ends of the vessel, and being provided with a branch tube or inverted funnel through which the fumes of sulfur, or sulfurous acid gas, or oxygen gas, can be introduced to mingle with the air to be carried through the vessel to act on the fabrics therein. And finally, in combining the vessel that contains the fabrics with a steam boiler by means of a pipe that steam may be made to circulate through the vessel.

1st. Of the process of seasoning raw india rubber or caoutchouc of commerce. The raw rubber is simply to be placed in a vessel and then subjected to the action of artificial heat, either by heating the vessel outside, by introducing a current of heated air and steam together, or by introducing a current of steam, the latter being the most efficient and expeditious. The heat in any form should be applied at a temperature varying from about 100° to 220° of Fahrenheit's scale, and the length of time required for the thorough extraction will depend on the size and thickness of the pieces and on the condition of the rubber, thick pieces requiring longer time than thin ones, and rubber just coming from the tree requiring more time than when it has been partly seasoned by exposure to the atmosphere. We prefer to carry on this operation in the apparatus described in this specification and represented in the accompanying drawings, in which it can be treated either with hot air or steam, or both.

2nd. Of the process of heating, curing, or drying india rubber fabrics. After the compounds of rubber, such as are employed in this branch of manufactures, have been spread onto the fabrics or made up into the form required, it is in a soft or tacky state which requires hardening, which has heretofore been done by exposing the articles made up to the action of heated air or steam. The effect of the air if too highly heated is to burn or char the surface, and of steam to stain or discolor and otherwise injure the surface of the goods by the condensation of the steam on the surface. To avoid this and produce goods with a lustrous and better surface we have found that the goods and the vessel in which they are contained should be heated up to a temperature above that of boiling water, preparatory to and during the introduction of steam to avoid the condensation of steam onto the goods. To effect this the goods are to be introduced in a vessel and heated up to a temperature a little over the boiling point either by passing a current of heated air through the vessel, or by applying heat to the outside of the vessel; and when it is ascertained that the goods or fabrics are all heated up to or a little above the boiling point, steam is introduced to act on the fabrics until the india rubber compound is thoroughly dried and hardened, the supply of steam is then shut off, and that within the vessel permitted to escape before the goods are removed. The steam should be applied at a temperature of say from 250° to 300° Fahrenheit's scale, and the fabrics should be exposed to this process for a period of time varying from two and a half to four hours, to be proportioned according to the thickness and quantity.

3d. Of the application of sulfur to india rubber goods. In the process of curing or drying india rubber fabrics the presence of sulfur in the compound has been heretofore deemed necessary, and for this purpose pulverized sulfur (or the flowers of sulfur) has either been incorporated with the compound, or spread onto its surface, either of which modes is objectionable. Instead of this we subject the fabrics, either before or during the process of curing or drying to the fumes of sulfur, or to sulfurous acid gas, which we find by experiment to diffuse itself more thoroughly and to act more uniformly over the surface of the fabrics than when applied in the solid form. Another and highly important advantage of this process is that it avoids the necessity of boiling the fabrics in alkaline solutions, which is required when the sulfur is applied in the solid form to remove the surplus.

4th. Of the substitute for the sunning process. After india rubber fabrics have been cured or dried they are placed in a vessel and a rapid current of air carried over them which has the effect thoroughly to remove the peculiar clammy feeling well known to all who are conversant with this branch of manufactures and which was never effected until our invention except by exposure to the solar rays which is very objectionable, as the manufacturer is thereby rendered wholly dependent on the weather in his operations, but by our plan this branch of the manufacture is placed wholly under his control. We prefer for this purpose to use a current of air heated up to about 112° Fahrenheit's scale, but we do not wish to confine ourselves to any degree of temperature.

5th. Of the apparatus. In the accompanying drawings (A) represents a vertical metal cylinder having a removable top (B) secured to a flanch by clamps or screw bolts. To the inside of this is fitted a series of hoops (a) connected together by bars (b) and all attached to a center piece (c) provided with a loop (d), so that by means of tackle (e) the whole frame can be let down into, and drawn up out of the cylinder. The fabrics to be acted on in this apparatus are hung loosely to the rings and bars of this movable frame; and when introduced within the cylinder and the cap or tops secured they may be subjected to the required operations.

Steam is supplied to the cylinder from a horizontal steam generator or boiler (H) by means of a pipe (M) that opens into the cylinder near the top thereof, and when the steam is to be introduced in the cylinder for the purpose of coloring india rubber or fabrics, a perforated vessel (f) containing the coloring matter in a pulverized or reduced state, is attached to the inside of the cylinder and over the end of the steam pipe to insure the passage of the steam through the coloring matter, or this vessel may be placed just below the aperture of the steam pipe to insure the passage of the steam over the coloring matter; but when the steam is to be introduced into the cylinder for any other purpose than coloring then the vessel containing the coloring matter should be removed or the coloring matter taken out. The steam pipe is provided with a stop cock (L) near the cylinder for the purpose of shutting off steam.

From near the bottom of the cylinder and to receive the contained air therefrom a pipe (G) runs up vertically for a short distance and passes out horizontally and into the steam boiler and thence out again, and runs up to near the top of the cylinder and is there provided with a stop cock or valve (D), a similar stop cock or valve (C) being placed near the junction of the pipe and the lower end of the cylinder. That part of the pipe which lies between the lower end of the cylinder and the boiler is provided with a rotary fan blower (E) by the rotation of which the air is exhausted from the cylinder and forced to pass through that part of the pipe that passes through the boiler to be heated, and thence to enter the top of the cylinder, the rotation of the fan in this way inducing a rapid current of air through the cylinder to act on the fabrics therein, and at the same time heating the air in its passage through that part of the pipe which passes through the boiler. Between the fan blower and the cylinder the pipe is provided with a short branch pipe running downward and provided with a stop cock (P) and an inverted funnel (O) for the purpose of impregnating the air which is carried through or into the cylinder with either the fumes of sulfur or sulfurous acid gas, or oxygen gas. The vessel which supplies the gas or fumes is placed under the funnel, and the rotation of the fan exhausting the pipe induces the gas or fumes to rush in and mingle with the air. But when these fumes or gases are to be introduced into the cylinder without admixture with atmospheric air, the stop cock (C) is closed, and the fumes or gases are alone drawn into the pipe by the rotation of the fan blower and discharged onto the fabrics in the cylinder. There is a discharge pipe and stop cock (N) near the bottom of the cylinder for the discharge of condensed steam from the cylinder.

The cylinder may be surrounded by a jacket (A') to form a space between them into which steam is admitted from the boiler by a pipe (f,) for the purpose of heating the cylinder and keeping it up to the required temperature; and this jacket is also provided with a discharge pipe and stop cock (D') for the discharge of condensed steam from the space between the cylinder and jacket, it is obvious that instead of the jacket tubes may be employed for heating in any well known way.

Having thus described the nature of our invention and the various modes of procedure, together with the construction of the apparatus which we employ, what we claim as our invention and desire to secure by Letters Patent is—

1. The method of seasoning raw india rubber or caoutchouc, or extracting therefrom what is termed the "sap" by subjecting it to the action of dry or moist artificial heat separately or together, whereby we are enabled thoroughly to season raw india rubber, and to extract the sap therefrom in a much shorter time than by exposure to the action of the atmosphere, as described.

2. We claim the method of heating, curing, or drying india rubber fabrics made of any compound of which rubber is the basis by subjecting them to the combined action of dry heat and steam, substantially as described, whereby the steam is prevented from condensing on the surface of the fabrics and injuring the surface and the luster thereof, and whereby a more perfect surface is produced than when subjected to either dry heat or steam separately, as described.

3. We claim submitting india rubber fabrics to the action of the fumes of sulfur, or sulfurous acid gas, preparatory to the curing or drying process, substantially as described, instead of incorporating the sulfur with the rubber or spreading it on the surface, as described.

4. We claim passing a current of air over the surface of india rubber fabrics for the purpose of removing the peculiar clammy feeling left on the surface of these fabrics after the curing or drying process, and which has heretofore been effected by exposure to the solar rays as described.

5. We claim the vertical cylinder in which the above processes are carried on in combination with the movable frame to which the fabrics are suspended, substantially as described.

6. We claim the method of heating the cylinder which contains the fabric substantially as described in combination with the method of introducing steam therein as described.

7. We claim in combination with the vessel that receives the fabrics the tube, for the circulation of air, the two ends of which connect with the said vessel, when the said tube is provided with a blower or other apparatus for inducing the current of air through it, and made to pass through a heating apparatus, as described.

8. And finally, we claim in combination with the cylinder and tube as described the means of introducing gases or fumes in the said tube to be conducted to the fabrics in the cylinder as described.

CHAS. J. GILBERT.
GAMALIEL GAY.

Witnesses:
A. P. BROWNE,
CHAS. M. KELLER.